Inventor
William O. Gates
By his Attorney

Nov. 24, 1953 W. O. GATES 2,660,700
HARMONIC ANALYZER AND SYNTHESIZER APPARATUS
Filed Oct. 28, 1950 4 Sheets-Sheet 2

Inventor
William O. Gates
By his Attorney

Nov. 24, 1953 W. O. GATES 2,660,700
HARMONIC ANALYZER AND SYNTHESIZER APPARATUS
Filed Oct. 28, 1950 4 Sheets-Sheet 3
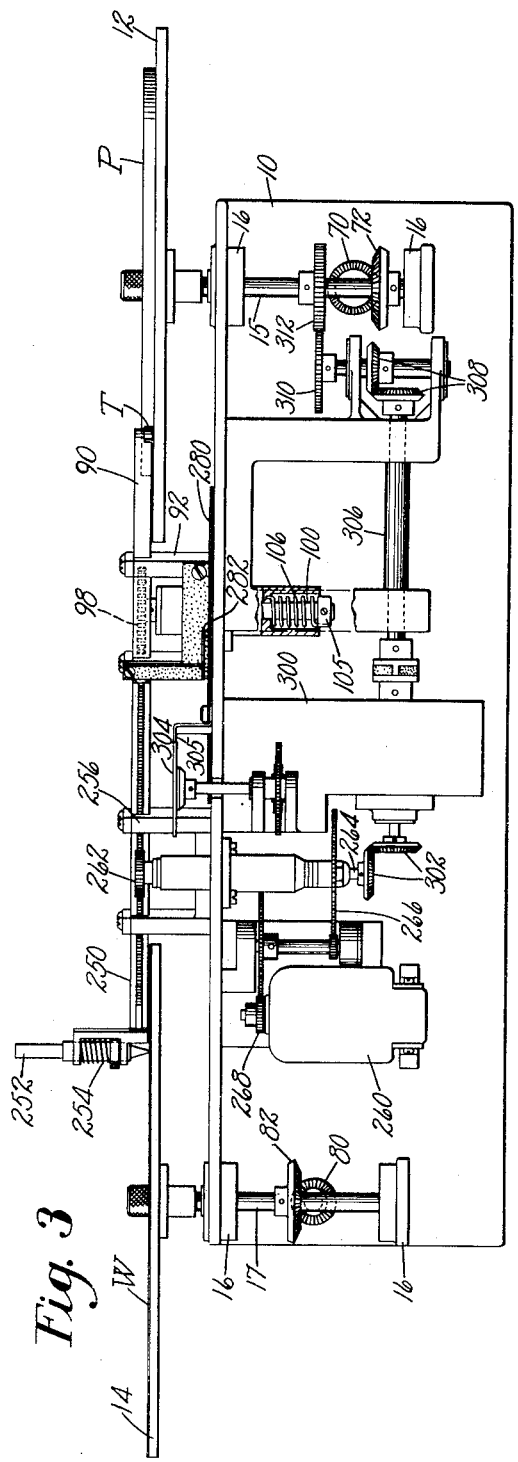
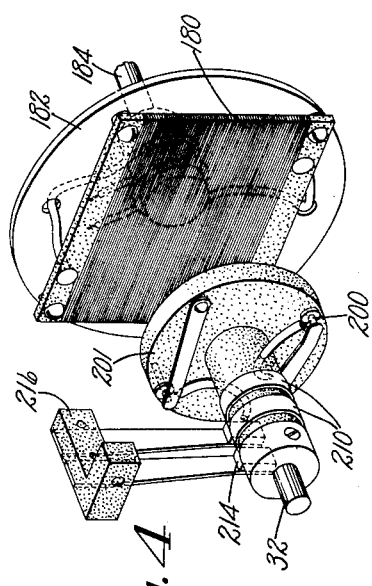
Inventor
William O. Gates
By his Attorney

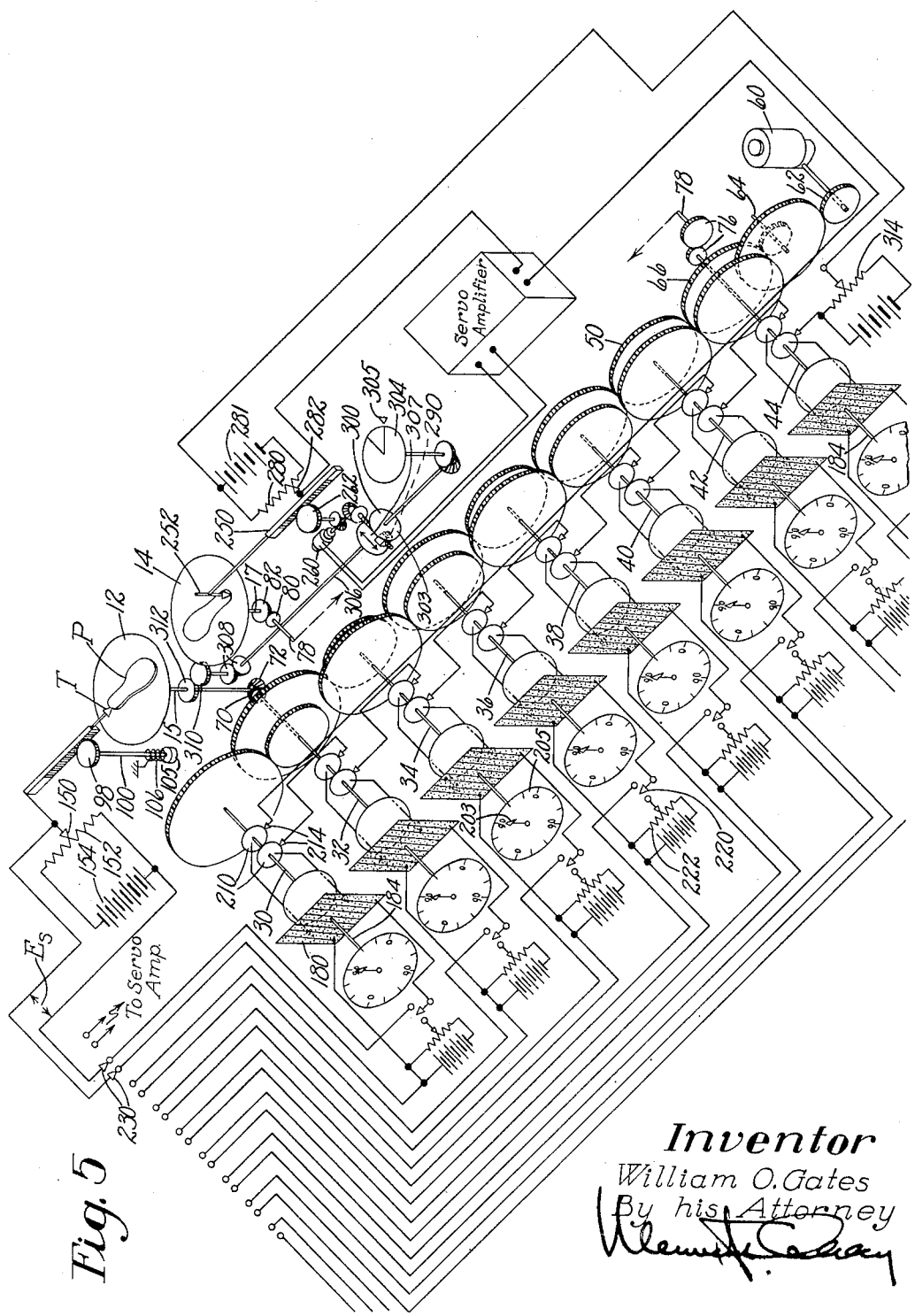

Patented Nov. 24, 1953

2,660,700

UNITED STATES PATENT OFFICE 2,660,700

HARMONIC ANALYZER AND SYNTHESIZER APPARATUS

William O. Gates, Beverly, Mass., assignor to United Shoe Machinery Corporation, Flemington, N. J., a corporation of New Jersey Application October 28, 1950, Serial No. 192,662

11 Claims. (Cl. 318—162)

This invention relates to improvements in arrangements for analyzing into recordable data movements of machine parts, for example, during a cycle of operation of a machine, and for controlling the movement of machine parts from such data to reproduce a predetermined movement of said parts.

The invention is illustrated as embodied in apparatus for deriving data defining a two-dimensional contour in terms of the magnitude of a condition which is a predetermined function of the position of a tool or tracer engaging the periphery of a contour pattern while the pattern is rotated, and for controlling, from corresponding data, the position of a tracing tool to reproduce the said contour upon a rotated workpiece. It is to be understood that in its general aspects the invention is not limited to use in machines of that particular construction.

In the history of automatic control of machine parts, cams and templates have long served as the records of memory devices to "remember" and control a cycle of relative movement between parts. However, because in its nature a cam or template is inflexible and adapted to remember only one permutation of movement, the cost of manufacture and storage of the necessary number of records may become excessive. Such may be the case for example, in machines for working on different styles or shapes of objects, for example, on shoes.

Similarly, these and certain other types of records may suffer from deterioration in storage or use so that the reproduced movement is inaccurate.

Further, a copy of the record, whatever its particular physical form, must generally be present at each location of use. This may multiply the cost of making records and of transporting them, and may involve inconvenience by delays.

Movements of parts in a machine cycle may be subjected to Fourier analysis to provide data, in the form of Fourier coefficients, adapted easily and inexpensively to be recorded, transmitted, or stored, and from which the original movements may be reproduced. Accordingly, an object of the invention is the provision of apparatus by which such data may be employed to reproduce a desired relative movement of parts.

To this end and in accordance with a feature of the invention, apparatus is provided by which prescribed sinusoidal voltages comprising consecutive harmonic components of a cyclic voltage variation may be generated and summed up to synthesize a voltage wave of predetermined form to control the movement of a machine part to reproduce a required movement.

The illustrated embodiment may be employed either to analyze a pattern by rotating its edge past a feeler to develop the pattern, translating the feeler movement into an electric voltage having a wave form corresponding to the developed pattern, and analyzing the resulting wave into its Fourier coefficients, or to trace the outline of a pattern by generating a plurality of sinusoidal voltages defined by their Fourier coefficients, synthesizing from these voltages a control voltage having the wave form of the developed pattern, and recreating the shape of the pattern by employing the control voltage to guide a stylus in tracing the outline of the pattern. To this end, a pair of rotatable supports are interconnected with the shafts of eight potentiometers, which are geared to rotate in ascending integral ratios of the rotation of the supports, the output of each potentiometer being a voltage proportional to an input voltage times a sinusoidal function of the shaft position.

For analyzing a pattern, a feeler associated with one support is arranged to provide to a selected one of the potentiometers an input voltage which varies with the distance of the feeler tip from the center of the support. The output of the potentiometer is supplied to an integrator whose summation over a cycle of rotation is proportional to an amplitude coefficient for the harmonic corresponding to the shaft rotation ratio. Sine and cosine amplitude Fourier coefficients are thus easily measured, and from these coefficients, amplitude and phase Fourier coefficients may be conveniently derived as further described hereinafter.

For synthesizing the outline of a pattern, switches are operated to connect each potentiometer to a source of direct voltage proportional to the amplitude coefficient of the corresponding harmonic, the angular position of the potentiometers is adjusted to set in the phase coefficients and the output voltages of the potentiometers are connected in series to provide a control voltage in relation to which a stylus associated with the other support is positioned along a path radially of the support. If the stylus and the rotatable support are both considered as supports or machine parts, then it will be seen that the position of one support or part may be controlled as a predetermined function of the position (i. e. angular position) of the other, the function being predetermined by the Fourier coefficients.

These and other features and objects of the invention will best be understood from a consideration of the following specification taken in connection with the accompanying drawings in which, Fig. 1 is a plan view of an apparatus embodying the invention, a top panel having been removed to disclose interior arrangements;

Fig. 3 is a rear elevation of the apparatus disclosed in Fig. 1;

Fig. 4 is a partially exploded angular view of a portion of the apparatus disclosed in Fig. 1 in which the elements are viewed from the rear; and Fig. 5 is a schematic diagram of the apparatus disclosed in Fig. 1.

Figure 1:
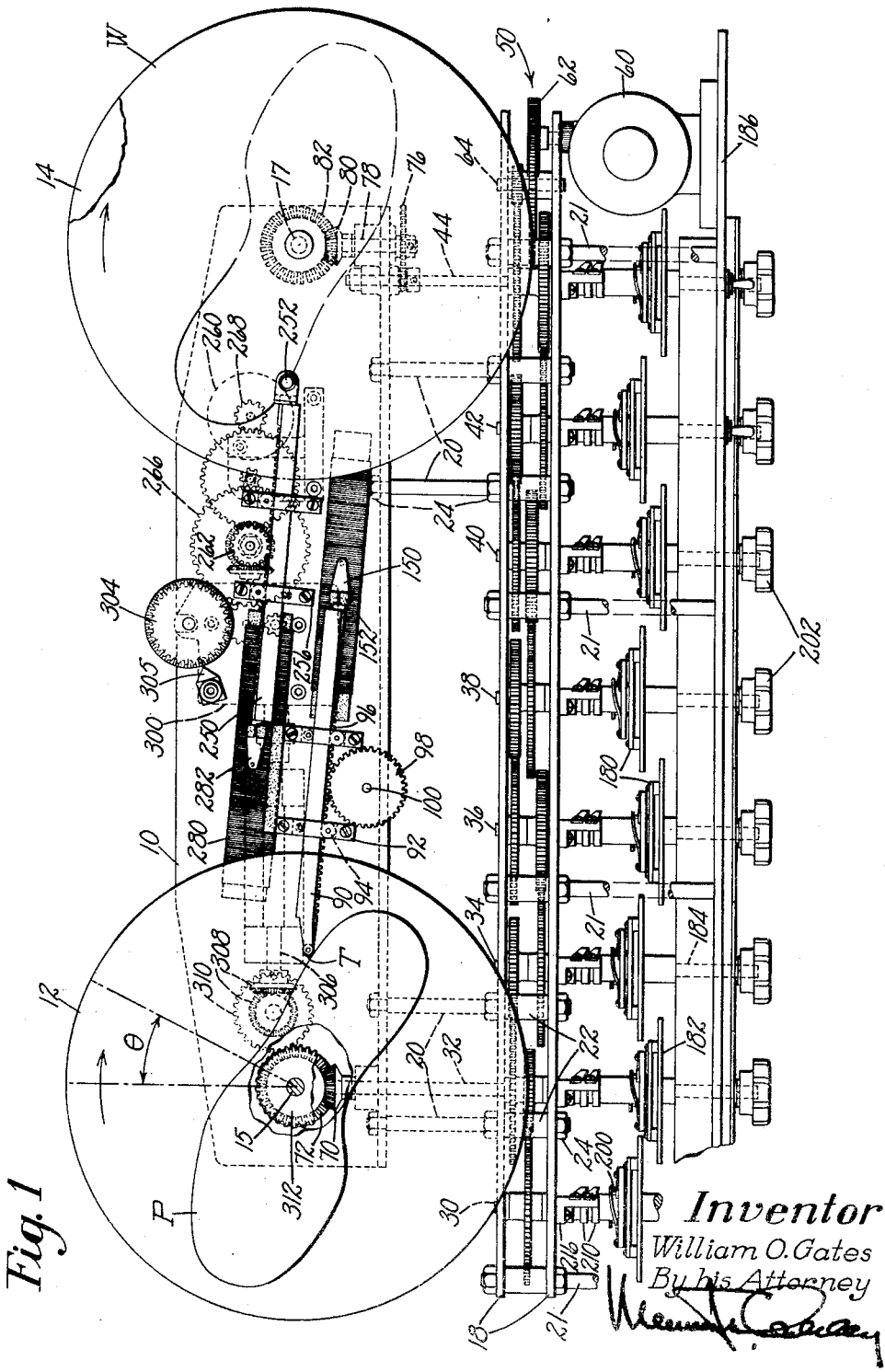

Referring to Figs. 1 and 3, the illustrative machine comprises a frame 10 on which are supported a rotatable pattern support 12 and a rotatable workpiece support 14. The supports 12 and 14 are respectively secured to upright shafts 15 and 17 journaled in bearings 16 secured to the frame 10. At the front of the machine, and running transversely thereof, is a pair of upright plates 18 secured to the frame 10 in parallel spaced disposition by machine bolts 20, sleeves 22 and nuts 24. Approximately halfway from top to bottom of the plates 18, a plurality of shafts 30, 32, 34, 36, 38, 40, 42 and 44 run from front to back of the machine. These shafts are geared together by a train of gears 50 to provide consecutive integral rotation ratios between shafts 32, 34, 36, 38, 40, 42, 44 and the shaft 30. That is, when shaft 30 makes one revolution, shaft 32 makes two revolutions, shaft 34 makes three revolutions, etc. The gear train 50 is connected to be driven by a motor 60 through a pinion 62, a gear and pinion on a countershaft 64, and a gear 66 on the shaft 44.

The pattern support 12 is connected to be driven by the motor 60 by connection to the shaft 32 through a pair of bevel gears 70 and 72, respectively secured to the shafts 32 and 15. The workpiece support 14 is connected to be similarly driven by connection to the shaft 44 through a gear and pinion 76, a countershaft 78, and a pair of bevel gears 80 and 82, respectively secured to shafts 78 and 17. The gearing is such that the supports 12 and 14 have a 1:1 rotation ratio with shaft 30.

As a pattern P on the support 12 is rotated through a cycle of movement by the motor 60, it will be seen that, as viewed along a fixed radius, the periphery of the pattern will have apparent movement inwardly and outwardly of the center of the support. Further, it will be seen that a history of the magnitude of the radial displacement of a periphery-engaging member at a fixed operating station, or more abstractly, of the magnitude of a condition which is a function of the position of such a member, for example, a voltage proportional to the distance of the periphery from the center of the support along a fixed radius, as related to the instantaneous angular position of the reference cycle of movement, e. g. a 360° rotation, will provide a record of the contour of the pattern, for the form of the wave of voltage will correspond to the pattern as developed by rotation.

To provide means for following the periphery of the pattern P on the support 12 as it is rotated, and for generating a voltage whose magnitude defines the instantaneous position of the periphery of the pattern along a fixed radius, an arm 90, carrying at one end a tracer roll T adapted to engage the periphery of the pattern, is supported for radial movement toward and away from the center of support 12 by a bracket 92 attached to the frame 10. The bracket 92 has aligned apertures formed by anti-friction rollers 94 which allow free movement of the arm 90 only in said directions. Teeth 96 on one side of the arm 90 engage a gear 98 attached to a shaft 100 extending downwardly through the frame 10. A spiral spring 103 (Fig. 3), around the shaft 100 and connected at one end to a collar 105 on the shaft and at the other end to the frame, yieldingly urges shaft 100 to rotate in a direction to urge the arm 90 inwardly to keep the tracer T in engagement with the pattern during rotation of support 12.

A slider 150 (Fig. 1) is mounted on the arm 90 and is arranged to be moved by the arm over a resistance card 152 energized from a source of direct current 154 (Fig. 5) to provide an output voltage $E_s$ proportional to the radial displacement of the tracer T from the center of the support 12.

Figure 2:
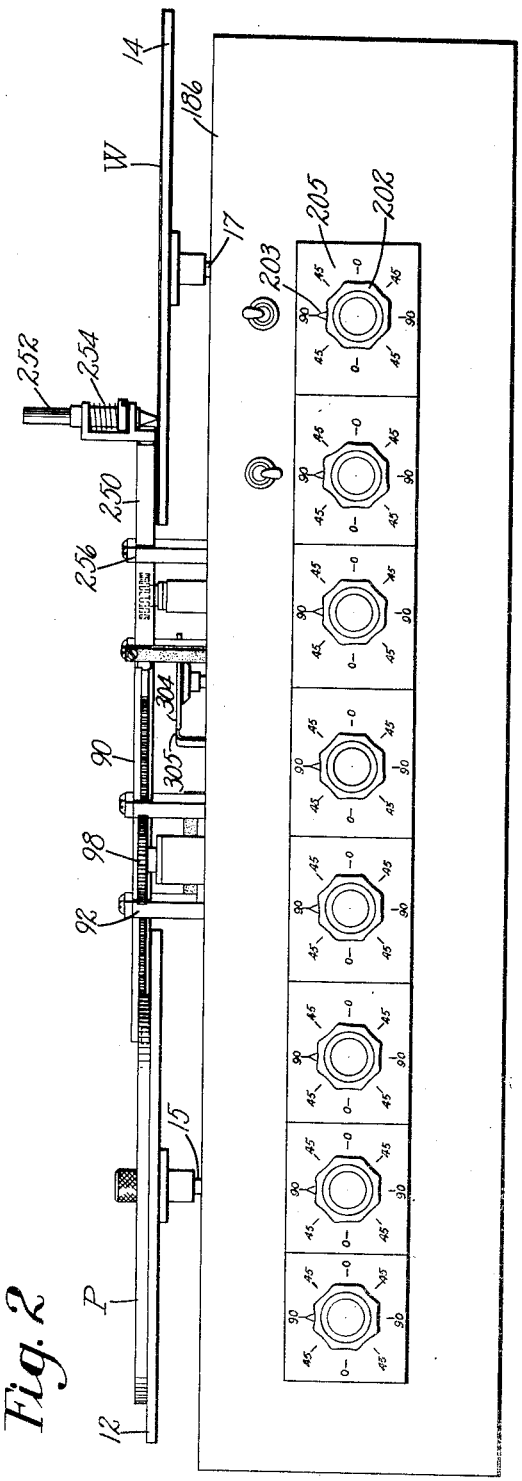
Fig. 2 is a front elevation of the apparatus shown in Fig. 1.

A linearly wound resistance card 180 (Fig. 4) is mounted on an insulating disk 182 at one end of each of eight shafts 184 aligned respectively with the eight shafts of the series 30, 32, etc., so that each of the cards is engaged by a pair of contacts 200 mounted on flanged insulating bushings 201 on each of the shafts of the series 30. The shafts 184 extend frontward through a panel 186 to receive knobs 202 (Fig. 2) by which each card may be turned to different positions indicated by pointers 203 and dials 205. This panel 186 is supported on the frame 10 by spacer bolts 21 (Fig. 1). The contacts 200 are connected to slip rings 210 (Fig. 4) which are engaged by brushes 214 resiliently mounted to an insulating bracket 216 attached to one of the plates 18. Each resistance card has one terminal connected to a double-throw switch 220 (Fig. 5) by which the card may be connected either across an adjustable D. C. voltage source 222 or to terminals of a multiple throw switch 230 through which the output from slider 150 may be applied to any selected card 180 or directly to a servo amplifier.

As shown in Figs. 1 and 3, an arm 250, carrying at one end a stylus 252 downwardly biased by a spring 254, is mounted in a bracket 256 similar to the bracket 92, to provide for movement of the stylus 252 radially toward and from the center of the workpiece support 14. As best seen in Fig. 3, the arm 250 is arranged to be driven inwardly and outwardly of the support 14 by a servomotor 260 to which it is connected by a gear 262 engaging teeth on the side of the arm, a shaft 264 and a train of gears 266 engaging a gear 268 on the motor shaft. The motor 260 is connected to a servo amplifier (Fig. 5) so that the motor is adapted to position the arm 250 in a predetermined relation to the magnitude of a control voltage applied to the servo amplifier. The follow-up portion of the servo loop comprises a resistance card 280 (Fig. 1) energized from a source of voltage 281. A contact 282 is adapted to travel over and to pick off from the resistance card 280 a voltage which varies with the position of the arm. This follow-up voltage is connected to the servo amplifier in series with the control voltage and it will be understood that the servo amplifier controls the motor 260 to rotate in a direction tending to equalize the control voltage and the follow-up voltage.

The motor 260 is also connected to position the balls 290 of a ball and disk integrator 300 of the type shown on page 25 of Computing Mechanisms and Linkages, Radiation Laboratory Series, vol. 27, McGraw-Hill Book Company, Inc., 1948.

This connection is made through a pair of bevel gears 302 one of which is attached to the shaft 264. Since such integrators are well-known, it will suffice to state that the integrator 300 provides an output comprising the distance of rotation of a cylinder 303 (indicated diagrammatically in Fig. 5) ascertained by noting the degrees of rotation of an indicator disk 304 driven by the cylinder with respect to a fixed pointer 305, which rotation is proportional to $\int f(X_1) dX_2$ where the position of the balls is described by the parameter $f(X_1)$ and the distance of rotation of an input shaft 306 which drives an input disk 307 of the integrator is described by the parameter $X_2$. This shaft is connected to be driven from shaft 15 through a pair of bevel gears 308 and gears 310 and 312, the latter being attached to the shaft 15.

As a pattern P on the support 12 is rotated to vary the angle $\theta$ of its cycle position, the output voltage $E_s$ of slider 150 will vary cyclically as a function of $\theta$. That is, $E_s = f(\theta)$.

According to the Fourier theorem, the periodic function of $\theta$ can be expanded as follows:

$$f(\theta) = \frac{a_0}{2} + a_1 \sin(\theta + \phi_1) + a_2 \sin(2\theta + \phi_2) + \ldots + a_n \sin(n\theta + \phi_n) + \ldots \quad (1)$$

These terms accordingly respectively define the D. C. and the harmonic components of the output voltage $E_s$ which harmonic components are voltages each varying sinusoidally at frequencies corresponding to consecutive harmonics of the cycle. Further, the instantaneous sum of a finite number of these components plus the D. C. voltage component (which may be zero) corresponds to the instantaneous value of the output voltage. The exactness of the correspondence depends, of course, on the extent to which this finite number includes the harmonic content of the function. While the invention is illustrated by apparatus providing eight consecutive harmonics, more or less consecutive harmonics may be employed. At least the first few consecutive harmonics must be provided where, as here, the apparatus is intended to analyze or to reproduce a variety of curves such as those developed from shoe patterns.

In operation, to analyze the harmonic components of the output voltage $E_s$ with respect to a cycle of rotation of the pattern P on support 12, the switches 220 and 230 are thrown to connect the output voltage of the slider 150 to that resistance card 180 engaged by contacts 209 which are rotated at a rotation ratio corresponding to the harmonic to be analyzed. For example, in Fig. 5, the switch 230 is shown in position to connect said output voltage to the card engaged by the contacts on shaft 30 for analyzing the fundamental harmonic. The brushes 214 engaging the slip rings 210 on shaft 30 are connected directly, by means not shown, to the servo amplifier, and the knob 202 is set to adjust the card 180 to zero phase angle. In this position when the motor 60 is started and the contacts 200 sweep over the card in synchronism with rotation of the support 12, the voltage taken off the card by the contacts will be the voltage applied to the card multiplied by the sine of the angular position $\theta$ of the support 12. The output voltage $E_s$ of the slider 150 is a function of the angular position of the support 12, that is $E_s = f(\theta)$ as stated above. Accordingly the voltage at the brushes 214 of the first pair of contacts is $f(\theta) \sin \theta$, while the output of the second pair of brushes 214 will be $f(\theta) \sin 2\theta$. In analyzing the first harmonic, that is, the fundamental, the voltage $f(\theta) \sin \theta$ is applied to the servo amplifier to control the ball of the integrator. Accordingly, for one rotation of the support 12, the output at the disk of the integrator will be:

$$A = K \int_0^{2\pi} f(\theta) \sin \theta d\theta \quad (2)$$

By proper choice of K, it can be shown that A will be equal to the amplitude coefficient $A_1$ of the first harmonic term of the Fourier series:

$$f(\theta) = \frac{a_0}{2} + A_1 \sin \theta + B_1 \cos \theta + A_2 \sin 2\theta + B_2 \cos 2\theta + \ldots \quad (3)$$

To obtain $B_1$, the fundamental card, that is the card opposite the contacts rotated 1:1 with the rotation of the support 12, is turned 90° by its knob 202 and the integration completed over a second cycle of rotation whereby the disk of the integrator reads:

$$B = K \int_0^{2\pi} f(\theta) \cos \theta d\theta = B_1 \quad (4)$$

For recording the fundamental component in terms of its amplitude coefficient $a_1$ and its phase angle coefficient $\phi_1$:

$$\phi_1 = \tan^{-1} \frac{B_1}{A_1}, \text{ and } a_1 = \sqrt{A_1^2 + B_1^2} \quad (5), (6)$$

singe generally, $$\phi_n = \tan^{-1} \frac{B_n}{A_n} \text{ and } a_n = \sqrt{A_n^2 + B_n^2} \quad (7), (8)$$

This procedure is carried out for each of the eight cards by connecting the brushes 214 one set at a time to the amplifier, and connecting the output voltage $E_s$ to the corresponding card 180. Also, the D. C. term $$\frac{a_0}{2}$$

is determined by connecting the output voltage $E_s$ directly to the servo amplifier to obtain the value of the integral:

$$\int_0^{2\pi} f(\theta) d(\theta)$$

This value is the average voltage of the output voltage $E_s$, and the value to be recorded for $a_0$ is twice this average value.

Thus there may be obtained data comprising the phase and amplitude coefficients of a Fourier series defining the position of a support or other machine part as a function of the angular position of a reference cycle. Alternatively, of course, these coefficients may be derived by mathematical analysis. In addition to other advantages, it will be seen that the definition of a pattern or a cyclic movement in terms of its Fourier coefficients is particularly adapted for ease in transmission by a telecommunication facility. For example, take the following definition of a shoe sole pattern as a function of a cycle of revolution:

| Harmonic | Sine Coefficient $A_n$ | Cosine Coefficient $B_n$ | $\sqrt{A_n^2+B_n^2}$ ($a_n$) | $\tan^{-1}\frac{B_n}{A_n}$ ($\phi_n$) |
|---|---|---|---|---|
| | | | | Degrees |
| 1 | 7.4 | 5.04 | 8.96 | 24.3 |
| 2 | 7.9 | −45.4 | 45.9 | 279.8 |
| 3 | 6.4 | −8.24 | 10.42 | 307.8 |
| 4 | −3.75 | 12.55 | 13.1 | 106.6 |
| 5 | −3.82 | 2.96 | 4.85 | 142.2 |
| 6 | .5 | −3.58 | 3.62 | 277.8 |
| 7 | −.25 | −1.19 | 1.22 | 258.1 |
| 8 | −.58 | .416 | .706 | 144.4 |
| D. C. | | | $a_0=71.5$ | |

It will be seen that a definition of this pattern could readily be telegraphed or telephoned from one state to another. The definition, of course, would comprise either the magnitude of the sine and cosine coefficients for each harmonic used, or the magnitude and phase coefficients of each harmonic, and the D. C. coefficient. The reference cycle, e. g. rotation, would normally be previously established, otherwise it must be included in the definition. While a complete table has been given for purposes of illustration, it will be understood that either set of coefficients $A_n$ and $B_n$ or $a_n$ and $\phi_n$ could be omitted since when one set of coefficients is given the other is determined thereby. When $\phi_n$ is to be calculated from $$\tan^{-1}\frac{B_n}{A_n}$$

it may be preferred to mark the dial in four quadrants of 90° each as shown in the drawings, the quadrants being determined in the usual manner.

For controlling from such data the movement of a tool in relation to a machine cycle, for example, for reproducing the contour of a pattern upon a workpiece W, the workpiece is positioned upon the support 14. Each resistance card 180 is connected by one of the switches 220 to its source of direct voltage 222, and the amplitude of this voltage is adjusted to correspond with the predetermined amplitude coefficient $a_n$ of the harmonic component related to the rotation ratio of its contacts 200, while the card is positioned by its knob 202 to the predetermined phase angle coefficient $\phi_n$ of the component.

All the sets of brushes 214 are then connected as shown in Fig. 5, namely in series with each other and with a source of D. C. voltage 314 which is adjusted to provide a voltage corresponding to the D. C. term $$\frac{a_0}{2}$$

and the resulting voltage is applied to the servo amplifier to control the position of the stylus 252.

When the motor 60 is started, as the support 14 rotates to vary the angle $\theta$ of its cycle position, the output of the first (or 1:1 revolution ratio) set of contacts will be $a_1 (\sin \theta+\phi_1)$, the output of the second set will be $a_2 (\sin 2\theta+\phi_2)$, etc. Accordingly, the voltage supplied to the servo amplifier will correspond to the original function, $f(\theta)$, (Eq. 1) and the servomotor 266 will position the stylus in accordance wit hthe instantaneous value of the function as related to the instantaneous angular position of the support 14 in its cycle so that the outline of the contour of the pattern will be traced on the workpiece W. If desired, of course, the D. C. term may be introduced in any other of several ways, for example, by adjusting the zero position of the stylus. Thus, considering the stylus 252 and the support 14 as first and second supports or machine parts, there is provided apparatus for controlling the position of a first support or part as a function of the position of a second support or part.

Having thus described my invention, what I claim as new and desire to secure by Letters Patent of the United States is:

1. Apparatus for controlling the position of a first support having a range of movement as a function of the angular position of a second support in a reference cycle of movement comprising, in combination, means for imparting movement in a cycle to said second support, means for generating a plurality of voltages varying sinusoidally with respect to the said cycle at consecutive harmonic frequencies of said cycle, and means connected to said first support to position it as a function of the magnitude of a control voltage comprising the sum of said voltages.

2. Apparatus as in claim 1 wherein said generating means includes means for adjusting the amplitude of each voltage and its phase relation to the cycle.

3. Apparatus for controlling the position of a first machine part having a range of movement as a function of the position of a second machine part movable in a cycle of movement comprising, in combination, means for imparting movement to said second part in its cycle of movement, means for generating a plurality of conditions having magnitudes measurable in similar units, said magnitudes varying in sinusoidal relation to said cycle at consecutive harmonic frequencies thereof, and means for controlling instantaneous position of said first part as a function of a magnitude comprising the sum of the instantaneous magnitudes of said conditions.

4. In apparatus of the class described, in combination, a first support arranged to be movable in a predetermined range, means for imparting to a second support movement in a predetermined cycle of movement, electrical means connected with said means for providing a plurality of voltages varying sinusoidally with the angular position of said cycle at consecutive harmonic frequencies thereof, and means for controlling the position of the first support as a function of a voltage comprising the sum of said voltages.

5. Apparatus as in claim 4 and additionally comprising means for varying independently the amplitude of each sinusoidal voltage and the phase relation between each of said sinusoidal voltages and the said cycle.

6. In apparatus of the class described, a first support, a rotatable second support, said first support being movable at an operating station radially of said second support, a plurality of sine wave voltage generators connected to be driven in synchronism with the rotation of said second support in consecutive ascending ratios of rotation to provide a plurality of voltages varying in sinusoidal relation to the angular position of said support in a cycle of rotation and at consecutive harmonic frequencies of said cycle, means for varying the amplitude of the sinusoidal output of each generator and the phase relation between said output and the cycle of rotation of said support, means for connecting said generators to provide a control voltage comprising the sum of said output voltages, and servo mechanism for controlling the position of said first support as a function of said control voltage.

7. In apparatus of the class described, a first movable support, a second movable support, servo mechanism for varying the position of the first support responsively to variations in the magnitude of a control voltage, a plurality of rotatable shafts, connections between said shafts and said second support for providing a predetermined relation between the movement of the support and the rotation of one of said shafts and for providing consecutive integral rotation ratios between the remaining shafts and said one shaft, a plurality of flat linearly wound resistance cards, means for connecting each of said cards to a source of variable D. C. voltage, a pair of contacts connected to each of said shafts for circular movement over said cards to pick off therefrom voltages varying sinusoidally with the rotation of the shafts, means for varying the angular position of each of said cards and means for series connecting the contacts to the servo mechanism to provide a control voltage comprising the sum of the voltages picked off by the contacts.

8. In apparatus of the class described, a movable machine part, a movable support, servo mechanism for varying the position of the support responsively to variations in the magnitude of a control voltage, a plurality of rotatable shafts, connections between said shafts and said part for providing a predetermined relation between the movement of said part and the rotation of one of said shafts and for providing consecutive integral rotation ratios between the remaining shafts and said one shaft, electrical means connected to each of said shafts and arranged each to provide a voltage varying sinusoidally with the rotation of the shaft to which it is connected, means for independently varying the amplitude and the phase of the voltage provided by each of said means, and means for connecting all of said means in series to the servo mechanism to provide a control voltage.

9. Apparatus for controlling the position of a machine part as a function of the angular position of a reference cycle comprising, in combination, a machine part arranged to be variably positionable, means for generating a plurality of voltages varying sinusoidally with respect to said cycle at consecutive harmonic frequencies of said cycle, and means for controlling the position of said part as a function of a control voltage comprising the sum of said voltages.

10. Apparatus as in claim 9 wherein said generating means includes means for adjusting the amplitude of each voltage and its phase relation to the cycle.

11. Apparatus for controlling the position of a support as a function of the angular position of a reference cycle comprising, in combination, a movable support, means for generating a plurality of voltages varying sinusoidally with respect to said cycle at consecutive harmonic frequencies of said cycle, and means for controlling the position of said support as a function of a control voltage comprising the sum of said voltages.

WILLIAM O. GATES.

References Cited in the file of this patent

UNITED STATES PATENTS

| Number | Name | Date |
|---|---|---|
| 1,123,067 | Barkhausen | Dec. 29, 1914 |
| 1,503,824 | Fry | Aug. 5, 1924 |
| 1,924,003 | Shaw | Aug. 22, 1933 |
| 2,212,799 | Sperry | Aug. 27, 1940 |
| 2,424,569 | Moseley | July 29, 1947 |
| 2,457,558 | Hornfeck | Dec. 28, 1948 |
| 2,499,178 | Berry et al. | Feb. 28, 1950 |
| 2,537,770 | Livingston | Jan. 9, 1951 |
| 2,540,797 | Stearns | Feb. 6, 1951 |
| 2,594,694 | Smith | Apr. 29, 1952 |